United States Patent Office 3,644,423
Patented Feb. 22, 1972

3,644,423
ORTHOESTERS DERIVED FROM GLYCEROL
David F. Roswell, Baltimore, David E. Kramm, Laurel, and Louis L. Wood, Potomac, Md., and Thomas R. Steadman, Convent Station, N.J., assignors to W. R. Grace & Co., New York, N.Y.
No Drawing. Continuation-in-part of application Ser. No. 574,259, Aug. 22, 1966. This application June 10, 1969, Ser. No. 832,030
Int. Cl. C07d 13/04
U.S. Cl. 260—340.9                       4 Claims

ABSTRACT OF THE DISCLOSURE

In abstract, this invention is directed to an orthoester having the formula

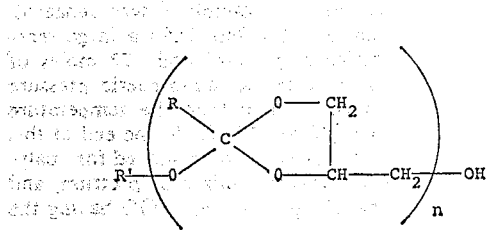

where R is hydrogen or lower alkyl and R' is lower alkyl and $n$ is an integer from 1–20 and to a method for preparing said orthoester by reacting glycerol with an orthoester having the formula R—C(OR')$_3$ where R and R' are as defined supra, all as recited hereinafter.

CROSS REFERENCE TO RELATED APPLICATIONS

This is a continuation-in-part of our copending application Ser. No. 574,259, filed Aug. 22, 1966, now abandoned.

BACKGROUND OF THE APPLICATION

Field of the invention

This invention is in the field of orthoesters and the preparation thereof.

More specifically, this invention is directed to a useful orthoester derived from glycerol; said orthoester can be prepared by an exchange reaction wherein glycerol is reacted with an orthoester having the formula R—C(OR')$_3$ in which R is hydrogen or lower alkyl and R' is lower alkyl. Where R is lower alkyl, R and R' can be identical or they can be different.

Description of prior art

A method for preparing orthoformates which utilizes an exchange reaction was described by Mkhitaryan, J. Gen. Chem. (USSR) 8, 1361 (1938). In this exchange synthesis at least one of the ethyl groups of triethyl orthoformate was displaced by the menthyl groups of menthol or the bornyl group of borneol.

SUMMARY OF THE INVENTION

In summary, this invention is directed to an orthoester having the formula

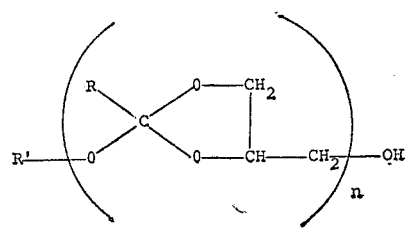

in which R is hydrogen or lower alkyl, R' is lower alkyl, and $n$ is an integer from 1 to about 20. As used herein lower alkyl means an alkyl group having from 1 to about 5 carbon atoms. Typical lower alkyl groups are methyl, ethyl, propyl, isopropyl, and the various butyl and pentyl groups (or radicals).

DESCRIPTION OF PREFERRED EMBODIMENTS

In preferred embodiments of the invention described in the above summary:

(1) $n$ is integer from 2 to about 15;
(2) R is methyl (CH$_3$—); and
(3) R' is ethyl (C$_2$H$_5$—).

In another preferred embodiment ("Embodiment A") this invention is directed to a process for preparing the product orthoester described in the above summary, said process comprising:

(a) Forming a first mixture by admixing; (i) an orthoester having the formula R—C(OR')$_3$ where R is hydrogen or lower alkyl and R' is lower alkyl; and (ii) glycerol in the mole ratio of about 1:0.95–1.5;
(b) Forming said product orthoester and a lower alcohol by heating the first mixture at about 90–196° C. (at atmospheric pressure or under reduced pressure) for about 2–100 hours;
(c) Separating the product orthoester from the lower alcohol; and
(d) Recovering the product orthoester.

In other preferred embodiments of the invention described in Embodiment A, supra:

(1) R is CH$_3$—;
(2) R' is C$_2$H$_5$;
(3) The first mixture is heated at about 90–120° C.; and
(4) The first mixture is heated for about 4–20 hours.

DETAILED DESCRIPTION OF THE INVENTION

We have found that an orthoester of the type described in the above summary, which we call PGO, which is useful as a thermostabilizer for polyvinyl chloride (PVC), and which has the formula

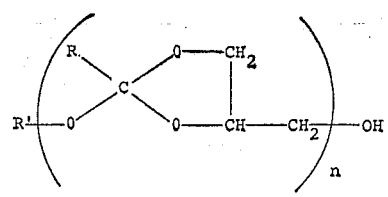

wherein R is hydrogen or lower alkyl, where R' is lower alkyl, and where $n$ is an integer from 1 to about 20, can be prepared by the reaction of glycerol with an orthoester which we refer to as a "lower orthoester" and which has the formula R—C(OR')$_3$, where R is hydrogen or lower alkyl and R' is lower alkyl, according to a reaction represented by the following equation:

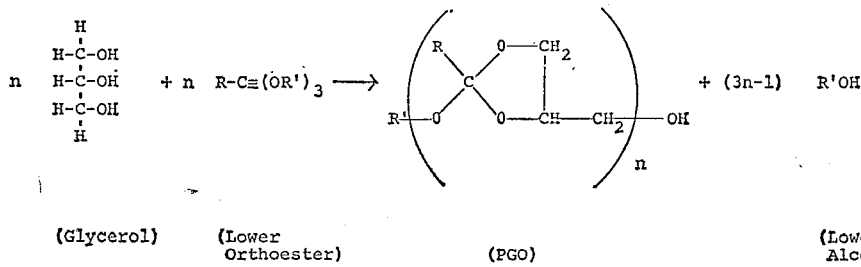

(Glycerol)  (Lower Orthoester)  (PGO)  (Lower Alcohol)

We have found that the reaction between a lower orthoester and glycerol to yield PGO is very slow at temperatures below 80° C. and that at temperatures above about 120 or 125° C. the product may become yellow. Accordingly, we prefer to use a temperature of about 90–120 ° C. Heating times of about 3–6 hours have given excellent results.

We have found that a preferred method (which gives excellent results) for removing by-product lower alcohol, i.e., for separating the product orthoester from the lower alcohol, comprises distilling the alcohol off as it is formed—using reduced pressure if required to cause the lower alcohol to boil at the preferred reaction temperature (about 90–120° C.).

Other methods, including the use of suitable solvents, for separating the PGO product from the by-product lower alcohol including the use of solvent extraction will, as a consequence of our disclosure, be readily apparent to those skilled in the art.

Our invention is further illustrated by the following examples.

EXAMPLE I 0.75 mole of glycerol and 0.5 mole of triethyl orthoacetate were admixed in a stirred, heated, vented reactor (the vent communicating with a fractionating column and a condenser for distilling by-product ethanol from the reacting system—a major portion of such ethanol being distilled from the reactor as it (the ethanol) is formed) to form a first mixture. The reactor was provided with a thermowell for receiving a thermometer, thermocouple, or other temperature sensing device.

The first mixture was heated at about 110–120° C. for about 6 hours at atmospheric pressure (i.e., about 760 mm. of mercury) while removing and recovering most of the by-product ethanol via the distillation column and condenser.

A colorless PGO product having a (Brookfield) viscosity at 25° C. of 9.9 ×10³ centipoises was recovered in a yield of about 79%. Analysis (elemental analysis, infrered spectrum, and NMR) established that the product was an orthoester having the formula

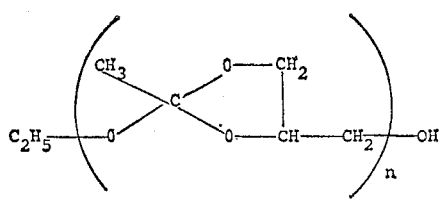

in which $n$ is 2.

EXAMPLE II

The general procedure of Example I was repeated. Howere, in this instance 1 mole of glycerol and 1 mole of TEOA were mixed with 0.004 mole of cetyl alcohol. The mixture was heated in the above described reactor at 130–140° C. for about 6 hours.

A colorless, slightly hazy, PGO product having a viscosity of 12×10³ centipoises was recovered in a yield of 96% of theory.

EXAMPLE III

The general procedure of Example I was repeated. However, in this instance 1 mole of glycerol and 1 mole of TEOA were mixed with about 250 ml. of toluene and placed in the above described reactor. The mixture was heated for about 2 hours at about 120° C. during which time the toluene and the by-product ethanol distilled out. The recovered product was pale yellow PGO. Conversion was 100% of theory. The PGO had a viscosity of 4.5×10⁴ centipoises.

EXAMPLE IV

The general procedure of Example I was repeated. However, in this example (Run No. 169) a large reactor was used. 270 moles of glycerol and 272 moles of TEOA were mixed and heated at atmospheric pressure for about 3 hours during which time the temperature was brought from about 40 to 113° C. At the end of this time a 1 lb. sample of the product was removed for analysis. Analysis (elemental analysis, infrared spectrum, and NMR) established that the product was PGO having the formula

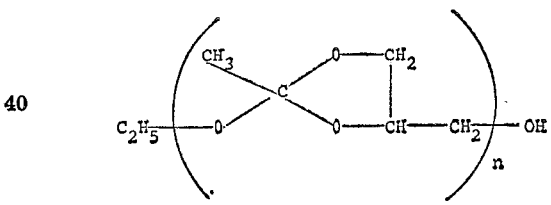

in which $n$ is 1. Conversion was 93% of theory, the product was colorless, and its orthoester content was found to be about 83% of theory. Its viscosity was 9.2×10¹ centipoises at 25° C.

EXAMPLE V

The general procedure of Example I and IV was repeated. However, in this instance (Run No. 158) the reactor was somewhat larger than that used in Example I but smaller than that used in Example IV. 25 moles of glycerol and 26.3 moles of TEOA were used. The glycerol was placed in the reactor and TEOA was added over a 3 hour period during which time the temperature of the material in the reactor increased from about 25 to 100° C. Most of the by-product ethanol distilled out during this stage of the run. The last portions of this ethanol were removed by heating for 5 hours at 110° C. under reduced pressure (ca. 8 mm. of mercury). Conversion was 100% of theory; the product was colorless and it had an orthoester content of 92% of theory. Its viscosity was 3.3×10³ centipoises at 25° C. Analysis established that the product was PGO having the formula

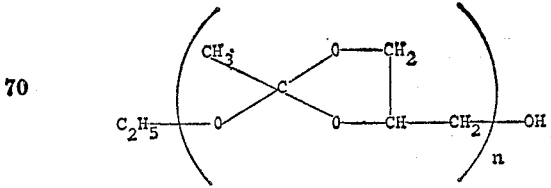

in which $n$ is 2.

EXAMPLE VI

The general procedure of Example V was repeated. However, in this instance (Run No. 155) the quantities of reactants were 25 moles of glycerol and 26.3 moles of TEOA. The TEOA was added to the glycerol over a 3 hour period during which time the temperature increased from about 95 to 110° C. Pressure was 1 atmosphere. At the end of this time the last traces of by-product ethanol were removed by heating the mixture at 110° C. at about 20 mm. of mercury for 8 hours. The product was colorless and its orthoester content was 81% of theory. It had a viscosity of $7.0 \times 10^3$ centipoises at 25° C. This product was identified as PGO having the formula

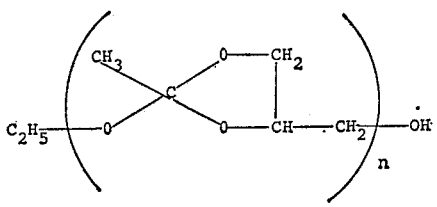

in which $n$ is 3.

EXAMPLE VII

In this run (Run No. 168) the general procedure of Example IV was repeated using 271 moles of glycerol and 272 moles of TEOA. The TEOA and glycerol were heated together for 4 hours at about 110° C. and 1 atmosphere pressure. The mixture was then heated at a temperature ranging from 80 to about 110° C. at a pressure ranging from about 130–600 mm. of mercury for about 3.5 hours. The product was identified as PGO having the formula

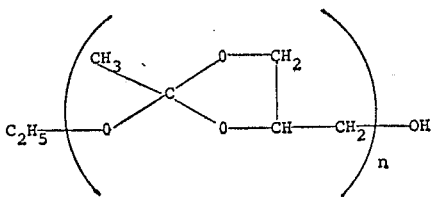

in which $n$ is 4. Conversion was about 100% of theory, and the product was colorless. It had an orthoester content of about 89% of theory and its viscosity at 25° C. was $1.0 \times 10^4$ centipoises.

EXAMPLE VIII

In this run (Run No. 161) the general procedure of Example V was repeated using 25 moles of glycerol and 25 moles of TEOA. The TEOA and the glycerol were heated together at 90–110° C. for 10 hours at atmospheric pressure and then at a temperature ranging between 110 and 196° C. at atmosphere for 20 minutes. Finally, to remove the last traces of by-product ethanol, the product was heated at 100° C. at 10–15 mm. of mercury pressure for about 3 hours. The product was identified as PGO having the formula

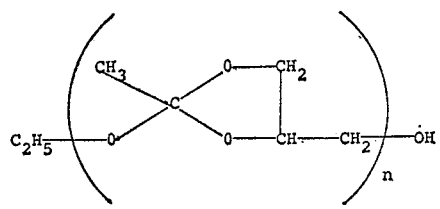

in which $n$ is 5. Conversion was 96% of theory, and the product was pale yellow. Its orthoester content was 95% of theory and its viscosity was $3.0 \times 10^5$ centipoises at 25° C.

EXAMPLE IX

In this run (Run No. 174) the general procedure of Example I was repeated. However, a somewhat larger reactor was used. A mixture of 5 moles of glycerol and 5 moles of TEOA was heated at 90–120° C. and 1 atmosphere pressure while distilling of the byproduct ethanol. After most of the ethanol had been distilled, the pressure on the system was reduced to about 7 mm. of mercury and heating was continued for a total of 72 hours. The product was identified as PGO having the formula

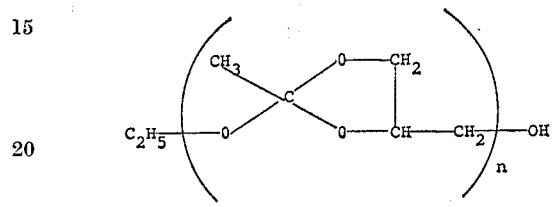

in which $n$ is 14. Conversion was 99% of theory. The product was yellow and had an orthoester content of 91% of theory. The viscosity of the product at 25° C. was $2.0 \times 10^6$ centipoises.

In other runs PGO's having the formula

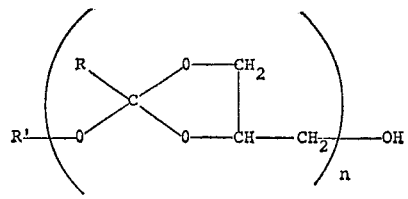

in which $n$ is 1 to about 15, R is hydrogen, or propyl, or isopropyl, or a butyl radical, or a pentyl radical, have been prepared by replacing the TEOA with an orthoester having the formula $R\text{---}C(OR')_3$ in which R is H, ethyl, normal propyl, isopropyl, a butyl radical, or a pentyl radical.

In still other runs PGO's in which R' is methyl, normal propyl, isopropyl, a butyl radical, or a pentyl radical have been formed by replacing the TEOA with an orthoacetate having the formula $R\text{---}C(OR')_3$ in which R' is methyl, isopropyl, normal propyl, a butyl radical, or a pentyl radical. In other runs the value of $n$ in orthoesters having the formula

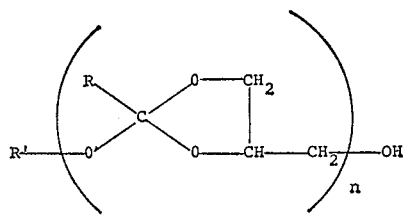

where R is hydrogen, ethyl, methyl, a propyl, butyl or pentyl radical and R' is a methyl, ethyl, propyl, butyl, or pentyl radical has been brought up to 20 or 21 by increasing the reaction temperature (e.g., up to about 196° C.) and/or reaction time (e.g., up to about 100 hours).

We claim:
1. An orthoester having the formula

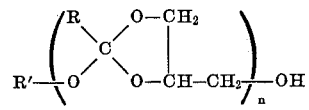

in which R is hydrogen, methyl, ethyl, n-propyl, isopropyl, a butyl radical, or a pentyl radical, R' is methyl, ethyl, n-propyl, isopropyl, a butyl radical, or a pentyl radical, and $n$ is an integer from 1 to 20.

2. The orthoester of claim 1 in which $n$ is an integer from 2 to 15.

3. The orthoester of claim 1 in which R is $CH_3$—.

4. The orthoester of claim 1 in which R' is $C_2H_5$—.

References Cited

UNITED STATES PATENTS 2,636,884   4/1953   Tenebaum et al. ____ 260—340.9

ALEX MAZEL, Primary Examiner

J. H. TURNIPSEED, Assistant Examiner